United States Patent

[11] 3,614,533

| [72] | Inventors | Ellwood S. Douglas<br>Orinda;<br>Wallace W. Wahlgren, Oakland, both of Calif. |
|---|---|---|
| [21] | Appl. No. | 39,056 |
| [22] | Filed | May 20, 1970 |
| [45] | Patented | Oct. 19, 1971 |
| [73] | Assignee | The Rucker Company<br>Oakland, Calif.<br>Continuation-in-part of application Ser. No. 18,518, Mar. 10, 1970. |

[54] GROUND FAULT DETECTOR AND CIRCUIT INTERRUPTER BY MAGNETIC FLUX STORAGE METHOD
33 Claims, 13 Drawing Figs.

[52] U.S. Cl. .................................................. 317/18 D,
317/27 R, 317/33 C, 317/33 SC, 317/49, 317/151
[51] Int. Cl. ......................................................... H02h 3/16
[50] Field of Search ........................................... 317/33 C,
151, 33 SC, 18 D, 27 R, 49; 340/253, 255, 253 A,
253 H, 253 N, 253 QY; 307/131

[56] References Cited
UNITED STATES PATENTS

| 2,594,372 | 4/1952 | Wattenberger ............... | 317/27 X |
| 3,308,345 | 3/1967 | Warrington .................. | 317/18 R |
| 3,504,234 | 3/1970 | Fitzgerald .................... | 317/27 R |
| 3,512,045 | 5/1970 | Tipton et al. ................ | 317/27 R X |

Primary Examiner—James D. Trammell
Attorney—Flehr, Hohbach, Test, Albritton & Herbert ABSTRACT: Miniaturized ground fault detector and current interrupter in which fault signals are stored in the form of magnetic flux in an inductor core. The core has a low input impedance and is driven by a differential transformer having a small core and a single-turn secondary winding. Means is provided for reading the stored flux signals out of the inductor core and operating a circuit breaker in response thereto. Means is also provided for counting the number of signals readout of the core and delaying the operation of the circuit breaker until a predetermined number have been counted.

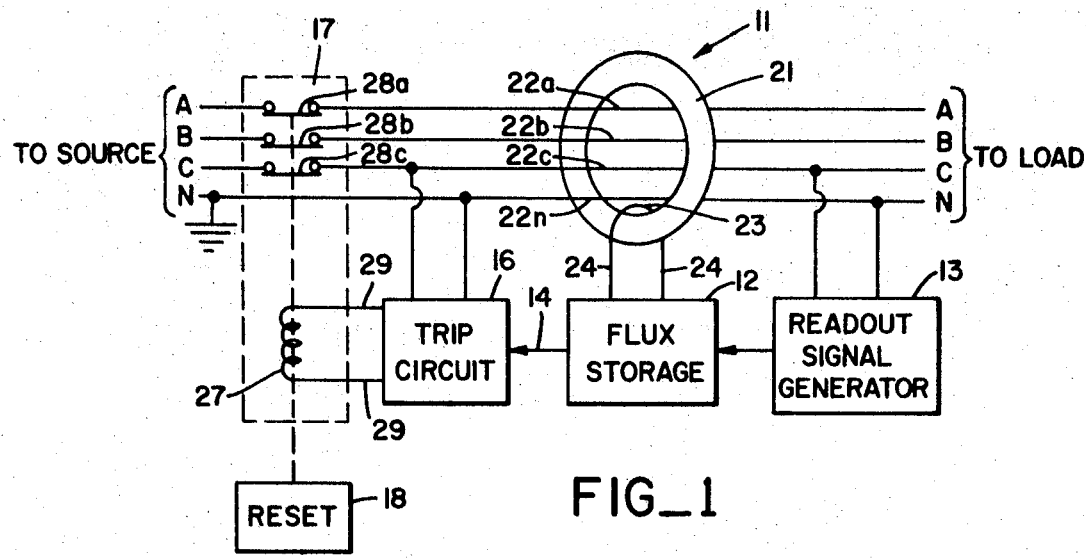
FIG_1
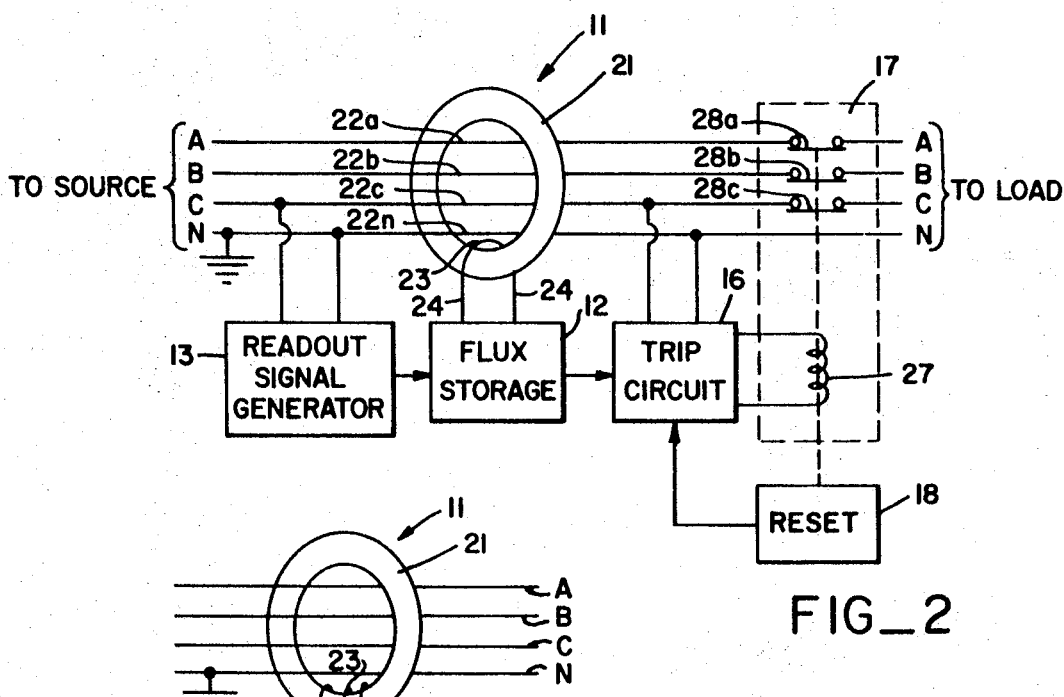
FIG_2
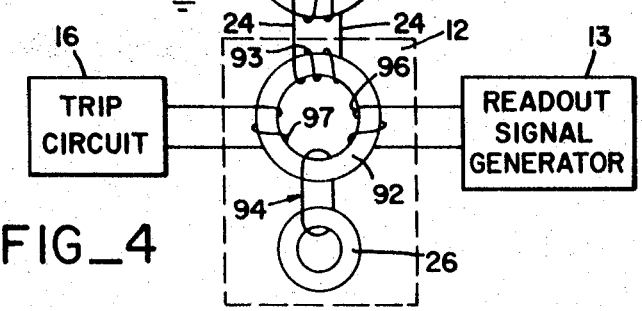
FIG_4
INVENTORS
ELLWOOD S. DOUGLAS
WALLACE W. WAHLGREN
ATTORNEYS

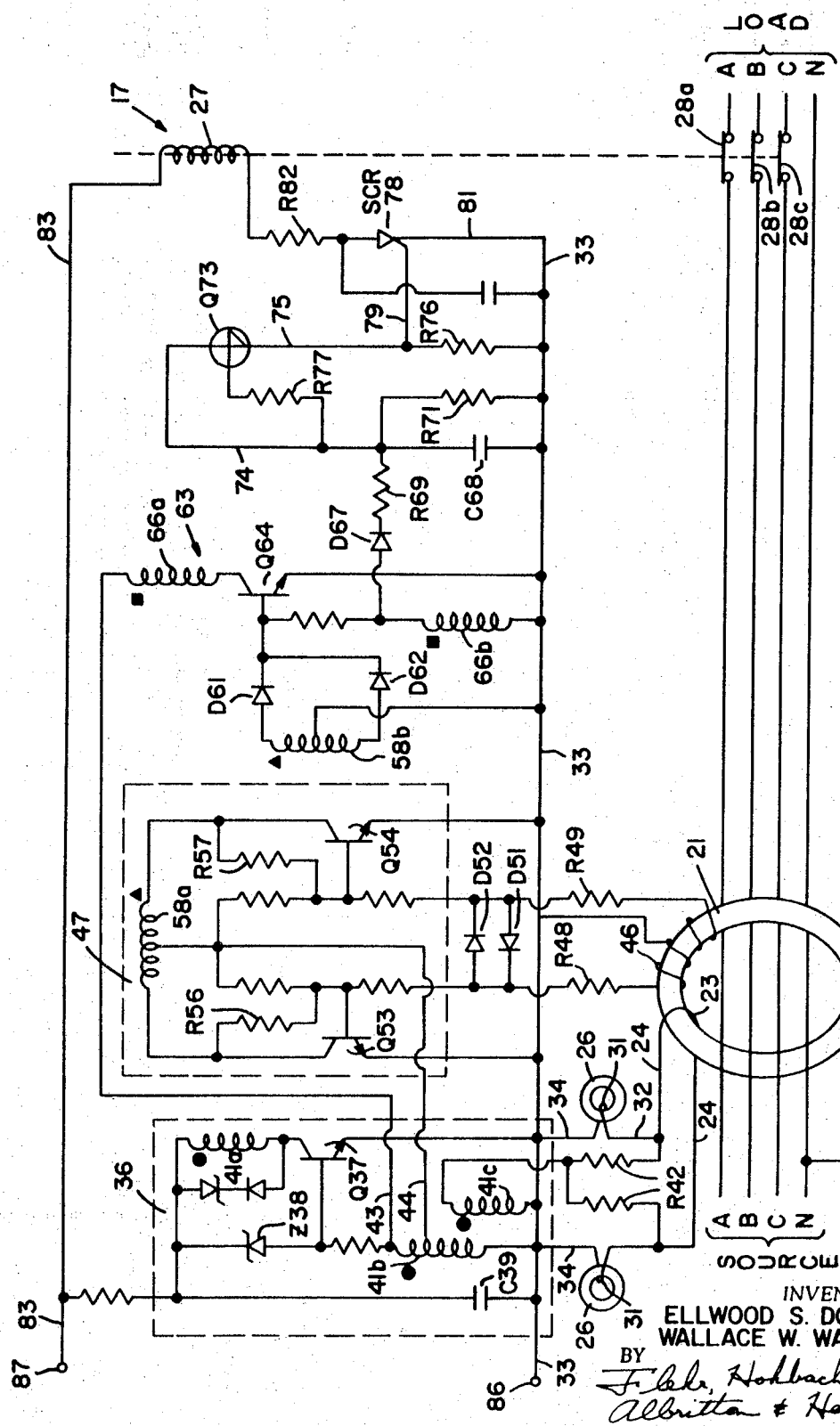
FIG_3

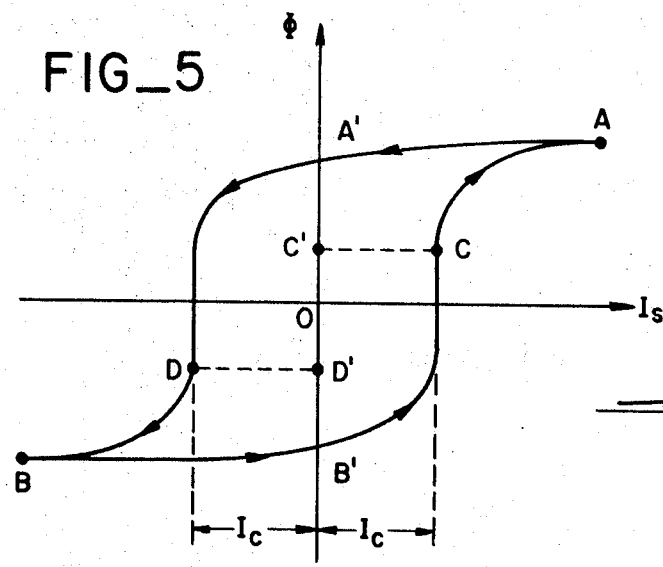
FIG_5
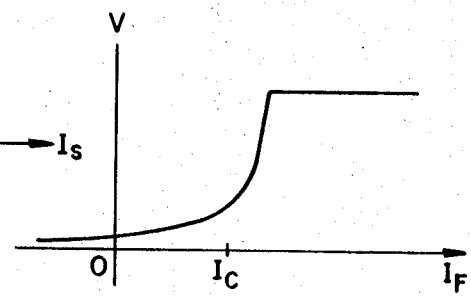
FIG_7
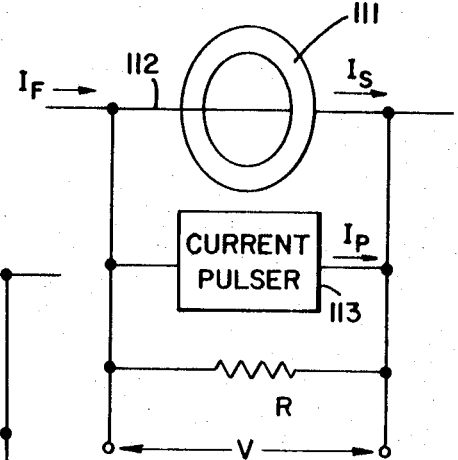
FIG_6
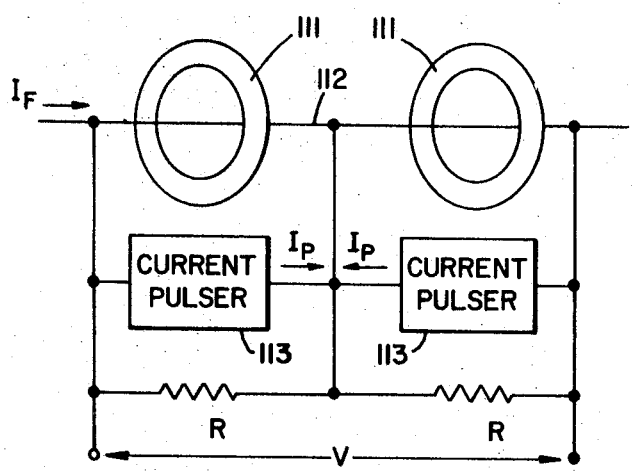
FIG_8
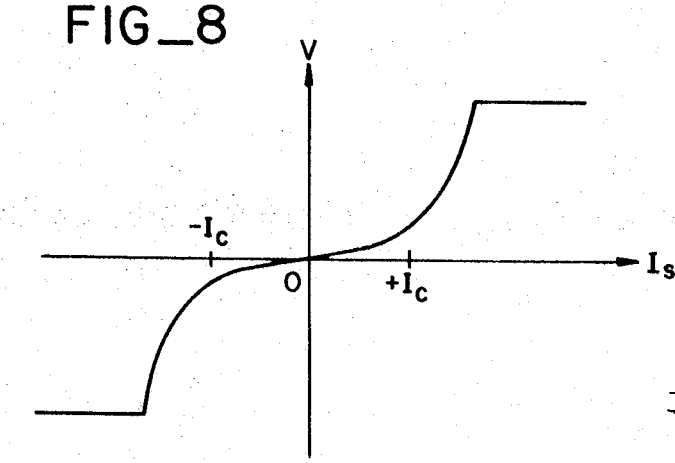
FIG_9

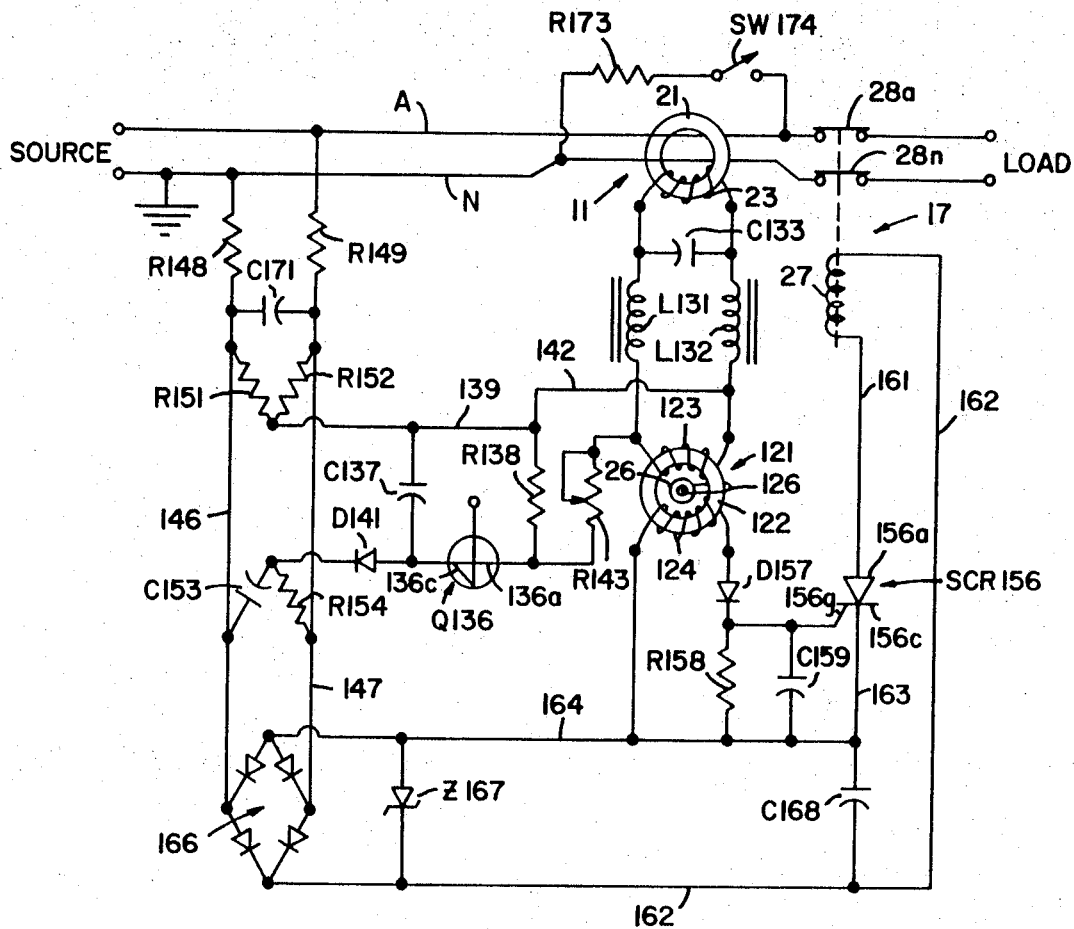
FIG_10
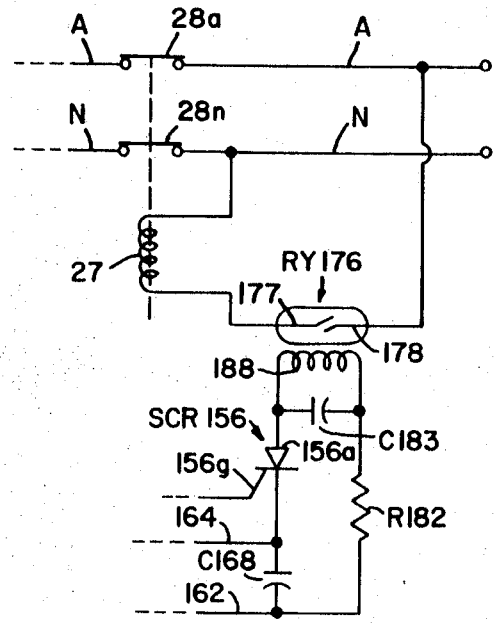
FIG_11

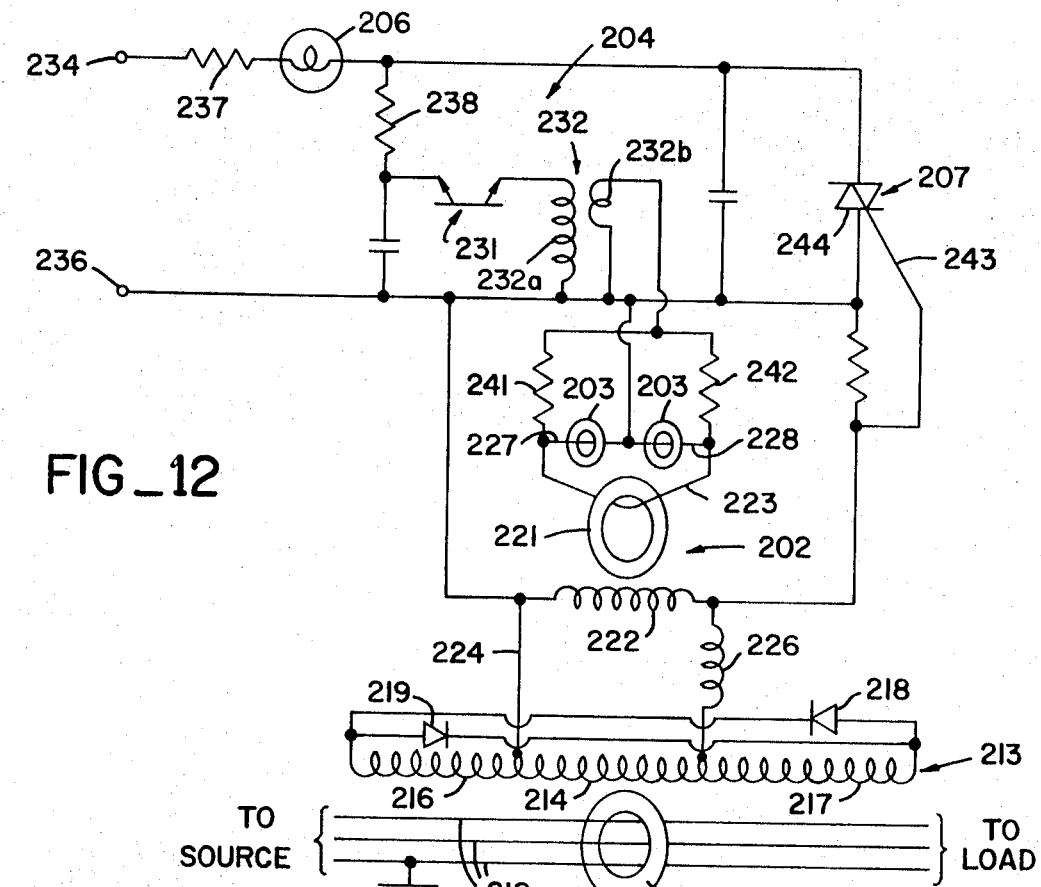
FIG_12
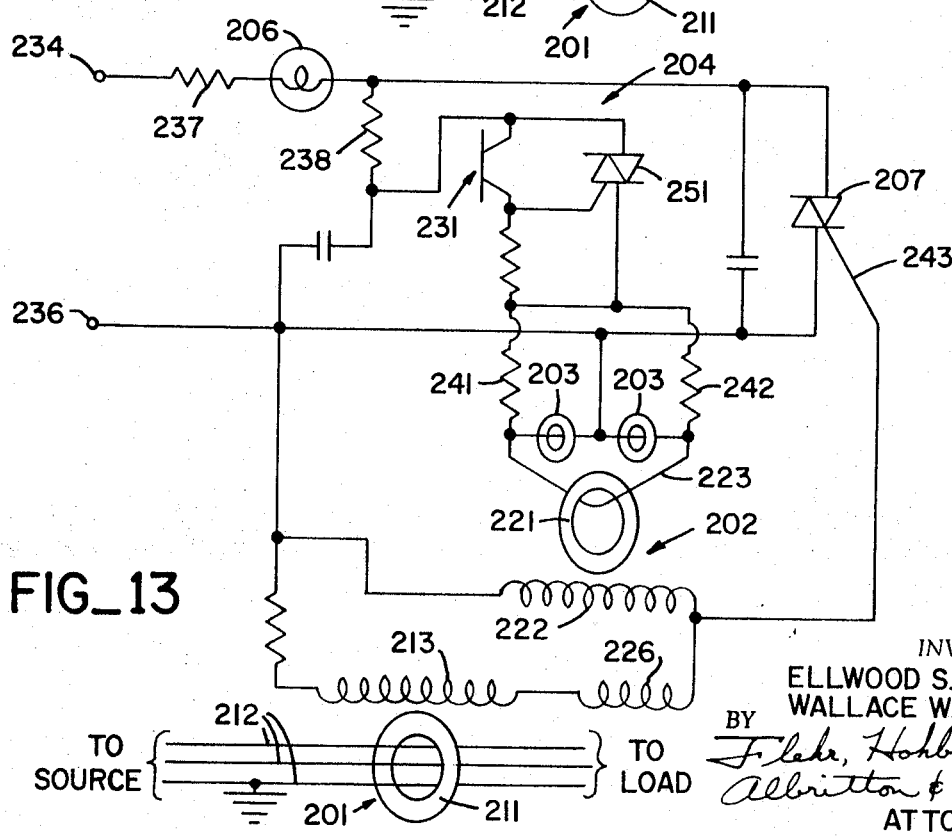
FIG_13
INVENTORS
ELLWOOD S. DOUGLAS
WALLACE W. WAHLGREN
BY Flehr, Hohbach, Test,
Albritton & Herbert
ATTORNEYS

3,614,533

GROUND FAULT DETECTOR AND CIRCUIT INTERRUPTER BY MAGNETIC FLUX STORAGE METHOD

CROSS-REFERENCE TO RELATED APPLICATIONS

This application is a continuation-in-part of application Ser. No. 18,158, filed Mar. 10, 1970.

BACKGROUND OF THE INVENTION

This invention pertains generally to systems for detecting ground faults and leakage currents in electrical circuits and more particularly to a ground-fault-detecting method and apparatus which can be incorporated in a small package.

Ground fault detectors have heretofore been provided utilizing a differential transformer in the conductors between an electrical source and a load for detecting when more current is flowing through the conductors to the load than is flowing back to the source through the conductors. Ground fault detectors of this character are described in U.S. Pat. No. 3,213,321, issued Oct. 19, 1965, to Charles F. Dalziel. The differential transformer used in such ground fault detectors includes a secondary winding in which a signal is induced when a ground fault occurs. The secondary winding is generally connected to an amplifier or to a switching device such as a silicon-controlled rectifier or a relay. These amplifiers and switching devices commonly have high input impedances, and in order to provide a sufficient signal for driving them, the secondary winding of the differential transformer must also have a high impedance.

In order to provide a high secondary impedance, the differential transformer must have a large magnetic core and/or a secondary winding having a large number of turns. Such transformers are generally high in cost and massive in size. For example, in order to produce a secondary signal in the microwatt range, it has been necessary to use a differential transformer having a physical size equivalent to a 10 to 25 watt AC power transformer. Such transformers are not suitable for incorporation in wiring panels or other devices for mass production and wide consumption and acceptance. There is, therefore, a need for a new and improved ground fault detector and method which overcome the forgoing and other problems encountered with ground fault detectors heretofore provided.

SUMMARY AND OBJECTS OF THE INVENTION

The present invention provides a ground fault detector and method in which the secondary winding of the differential transformer is coupled to a low-impedance memory core in which signals corresponding to ground fault currents are stored magnetically. This low-impedance load permits a substantial reduction in the size and cost of the differential transformer. Means is provided for reading the stored magnetic signals out of the memory core and interrupting the flow of current from the source to the load in response thereto. Means is also provided for counting the number of flux signals read out of the memory core and for delaying the interruption of the current until a predetermined number of signals have been read, thereby preventing undesired interruptions due to noise, transients, ground faults of very brief duration, and the like.

It is in general an object of the present invention to provide a new and improved ground fault detector and method.

Another object of the invention is to provide a ground fault detector and method of the above character which can be manufactured at low cost and incorporated in a small package.

Another object of the invention is to provide a ground fault detector and method of the above character in which the differential transformer is coupled to a circuit having a low input impedance.

Another object of the invention is to provide a ground fault detector of the above character which includes means for magnetically storing signals corresponding to ground faults.

Another object of the invention is to provide a ground fault detector and method of the above character which includes means for interrupting the flow of current between a source and a load in response to the magnetically stored signals.

Another object of the invention is to provide a ground fault detector and method of the above character which includes means for discriminating against noise, transients, and fault signals of abnormally short duration.

Another object of the invention is to provide a ground fault detector which includes means for indicating the occurrence of a ground fault without interrupting the flow of power to the load.

Additional objects and features of the invention will be apparent from the following description in which the preferred embodiments are set forth in detail in conjunction with the accompanying drawing.

BRIEF DESCRIPTION OF THE DRAWING

FIG. 1 is a block diagram of one embodiment of a ground fault detector and current interrupter incorporating the present invention.

FIG. 2 is a block diagram of another embodiment of a ground fault detector and current interrupter incorporating the present invention.

FIG. 3 is a schematic diagram of an embodiment of a ground fault detector and current interrupter similar to those illustrated in FIGS. 1 and 2.

FIG. 4 is a block diagram illustrating one magnetic storage circuit for use in the ground fault detector of the present invention.

FIG. 5 is a hysteresis curve for a square loop inductor core.

FIG. 6 is a circuit diagram illustrating an inductor core and current pulser for reading stored flux signals out of the inductor core.

FIG. 7 is a graphic representation of the output voltage of the circuit of FIG. 8 as a function of the current passing through the inductor core.

FIG. 8 is a circuit diagram illustrating a balanced circuit of the type illustrated in FIG. 6.

FIG. 9 is a graphic representation of the output voltage of the balanced circuit shown in FIG. 8 as a function of current.

FIG. 10 is a schematic diagram of another preferred embodiment of a ground fault detector and current interrupter incorporating the present invention.

FIG. 11 is a schematic diagram of an alternative switching circuit which can be utilized with the embodiment illustrated in FIG. 10.

FIG. 12 is a schematic diagram of one embodiment of a ground fault detector which includes means for visually indicating the occurrence of a ground fault.

FIG. 13 is a schematic diagram of another embodiment of a ground fault detector with means for visually indicating the occurrence of a ground fault.

DESCRIPTION OF THE PREFERRED EMBODIMENTS

The ground fault detector and method of the present invention can be utilized in any AC power distribution system having a return path to ground at the source. Thus, it can be used in conventional single-phase or polyphase circuits consisting of two, three or four wires, as long as some form of ground return is provided at the source end. In the drawing, the invention is illustrated in connection with a three-phase, four-wire system consisting of three underground conductors A, B and C, and a ground neutral conductor N. Although illustrated herein as a direct connection to ground, the ground return does not have to have a resistance of 0 ohms. The invention still operates satisfactorily with a resistance on the order of 2,000 ohms in the ground return.

As illustrated in FIG. 1, the ground fault detector comprises a differential transformer 11, magnetic flux storage means 12, and signal generator means 13 for reading signals out of the flux storage means. The output from the flux storage means appears in a circuit 14 and can be connected to monitoring means as desired. In the embodiments illustrated, the ground fault detector is combined with current interrupter means to provide a ground fault interrupter. Thus, the circuit 14 is connected to a trip circuit 16 wherein the signal from the flux storage means is conditioned for actuating a circuit breaker 17. Reset means 18 is provided for resetting the trip circuit and circuit breaker after a current-interrupting ground fault has been corrected.

It will be noted that the embodiments shown in FIGS. 1 and 2 are substantially the same except for the placement in the distribution circuit of the ground fault detector and current-interrupting means. In FIG. 1, the circuit breaker 17 is connected intermediate the source and the differential transformer 11, whereas in FIG. 2 the circuit breaker is intermediate the differential transformer and the load. Thus, in FIG. 1 embodiment, the power is removed from the ground fault detectors as well as the load upon the occurrence of a ground fault, whereas in the FIG. 2 embodiment the ground fault detector continues to receive power even though a ground fault causes the load to be discontinued.

The differential transformer 11 includes a generally toroidal core 21 fabricated of a magnetic material such as "Supermalloy" or a cast ferrite core material. The differential transformer also includes a plurality of primary windings 22a–22n passing through the toroidal core. These windings are connected in series with the conductors A–N, and they are generally equal in number to the number of conductors in the distribution circuit. Each of the primary windings makes the same number of turns around the toroidal core, and in the preferred embodiment they simply pass through the core to form single-turn windings. The configuration of the primary windings 22a–22n in the magnetic core 21 is balanced out so that the net flux in the core 21 is equal to zero. Under abnormal conditions, such as when the current flows to ground in the load, the current flow through the primary windings to the load is greater than the current flow back to the source through these windings, and a nonzero net flux is produced in the core 21.

The differential transformer 11 also includes a secondary winding 23 in which a signal is induced when a nonzero net magnetic flux exists in the core 21. In the illustrated embodiments in FIGS. 1–5, the secondary winding 23 consists if at least one turn on the core 21, and this winding is connected to the flux storage means 12 by conductors 24, 24.

The flux storage means 12 includes an inductor core 26 which is coupled to the core 21 of the differential transformer. The inductor core 26 is fabricated of a material adapted for switching between states of high and low permeability in accordance with the magnetomotive force applied thereto. In the preferred embodiment, this core is fabricated of a material having a high nickel content, commonly known as square loop material, such as "Square Permalloy 80." Such a material has a very low permeability at low MMF and a high permeability when the MMF exceeds the critical value. This critical value is chosen to correspond to the trip level desired. FOr example, if detection of a 5 milliampere ground fault current is desired, a reactor core can be used which changes from its low to its high state of permeability when the fault current reaches the 5 milliampere level. The inductor core 26 provides a relatively low-impedance load for the secondary winding of the differential transformer, and this permits the use of a small inexpensive differential transformer. For example, ground fault interrupters incorporating the present invention have been built utilizing a differential transformer having a core with an internal diameter on the order of three-eights of an inch. Such interrupters are conveniently housed in packages having a total volume on the order of 3 cubic inches. In one presently preferred embodiment, the inductor core is generally annular in shape, having an inside diameter on the order of 0.020 to 0.030 inch and a thickness on the order of 0.0005 inch to 0.014 inch.

The signal generator 13 provides means for reading stored flux signals out of the flux storage means. In one preferred embodiment, the generator comprises a conventional pulse generator adapted for supplying a train of pulses to the flux storage means.

The trip circuit 16 includes means for receiving the signal from the flux storage means 12 and conditioning this signal to operate the current-interrupting means 17. One simple embodiment of the trip circuit consists merely of an electronic switch such as a silicon-controlled rectifier. This simple circuit is suitable for use where the output of the flux storage means is of sufficient magnitude to trigger the SCR directly. In some applications, it may be desirable to provide means for detecting and amplifying the signal from the flux storage means before it is applied to the SCR.

In the preferred embodiments, the current-interrupting means 17 comprises a conventional circuit breaker or relay having an operating coil 27 and contacts 28a–28c. The coil 27 is connected to the output of the trip circuit 16 by conductors 29, and the contacts 28a–28c are connected in series with the distribution circuit conductors A–C, respectively.

FIG. 3 illustrates schematically one presently preferred embodiment of a ground fault current interrupter incorporating the present invention. In this embodiment, the flux storage means includes a pair of inductor cores 26, 26. Each of these cores is provided with a single-turn winding 31, one end of which is connected to the secondary winding 23 on the differential transformer 11 by circuits 32, 32 and 24, 24. The other ends of the windings 31 are connected to a common conductor 33 by conductors 34, 34.

A blocking oscillator 36 is provided for supplying a train of pulses to the inductor cores 26, 26 for reading stored flux signals out of them. The blocking oscillator is a conventional circuit and includes a transistor Q37, a zener diode Z38, a capacitor C39, and a transformer comprising windings 41a, 41b, and 41c. The output of the blocking oscillator appears across the winding 41C and is applied to reactor cores 26, 26 through resistors R42, R42 and conductors 32, 32.

While the primary purpose of the blocking oscillator 36 is to provide drive pulses at appropriate times to read information out of the reactor cores 26, 26 the blocking oscillator is also used as a pulsating power supply for the remainder of the ground fault interrupter circuit. Thus, conductors 43, 44 are connected to one end and a tap formed on the winding 41b to provide power for other portions of the circuit. By pulsing the circuit on and off, the susceptibility of the circuit to noise is significantly reduced. Likewise, the power requirements of the circuit and the size of the power supply are reduced.

Stored flux signals read out of the inductor cores 26, 26 are coupled back to the differential transformer 11 through the secondary winding 23. In this embodiment, the differential transformer also includes a tertiary winding 46 comprising a plurality of turns wound on the magnetic core 21. Alternatively, the tertiary winding can be placed on the inductor cores 26, 26. However, since it is desirable to have many turns linked with the flux stored in the inductor cores and in view of the relative sizes of the cores 21 and 26, it has been found to be more convenient to place the tertiary winding on the differential transformer.

The tertiary winding 46 is connected to the input of an operational amplifier 47 through a network consisting of resistors R48, R49, and diodes D51 and D52. This network limits the magnitude of the voltage which appears at the input of the amplifier 47. Such limitation has been found to be desirable to prevent damage to the amplifier by unusually large voltages. While the differential transformer is intended to sense fault currents as small as 5 milliamperes, faults on the order of several thousand amperes may pass through the differential transformer, causing relatively large voltages to appear across the tertiary winding.

The operational amplifier 47 is of conventional design and includes a pair of transistors Q53, Q54. a pair of feedback resistors R56, R57 is provided for controlling the gain of the amplifier, and the output of the stage appears across a transformer consisting of a primary winding 58a and a secondary winding 58b.

The secondary winding 58b is connected to a pair of diodes D61, D62 which constitute a full wave detector for rectifying the amplified signal from the tertiary winding. The output of the detector is connected to second blocking oscillator 63 consisting of a transistor Q64, a resistor R65, and a transformer having a primary winding 66a and a secondary winding 66b. This blocking oscillator is a conventional circuit adapted for firing when the signal from the detector is of sufficient amplitude to indicate the presence of a fault current.

The output of the second blocking oscillator 63 is applied through a diode D67 to an accumulator or integrator consisting of a capacitor C68 and resistors R69, R71. This accumulator provides means for counting the number of fault signals read out of the conductor cores 26, 26 and delaying the actuation of the current-interrupting means until a predetermined number have been counted. Each successive pulse from the second blocking oscillator raises the level of the voltage across the capacitor C68. The resistor R69 limits the current delivered to the capacitor C68 on any individual pulse, and the resistor R71 serves as a bleeder for discharging the capacitor C68 in the event that the pulses delivered to the capacitor in a predetermined time are not sufficient to indicate a fault.

The output of the accumulator is connected to the anode of a unilateral switch Q73 by a conductor 74. The cathode of the unilateral switch is returned to the common conductor 33 through a circuit 75 and a resistor 76. The unilateral switch is a bistable device which functions in a manner similar to a four-layer diode. As long as the voltage applied between the anode and cathode remains below a threshold value, the device remains nonconductive. When the applied voltage exceeds the threshold value, the switch turns on and remains conductive as long as it is supplied with a minimum holding current, such as 30milliamperes. The unilateral switch also has a gate, and the resistor R77 is connected between the gate and anode to stabilize the operation of the device and decrease the likelihood of false tripping.

The output of the unilateral switch Q73 is applied to the cathode gate of a silicon-controlled rectifier SCR 78 through circuits 75, 79. The cathode of the SCR is connected to the common conductor 33 through a resistor R82 to one end of the operating coil 27 of a relay or circuit breaker 17. THe other end of the coil 27 is connected to a circuit 83 which is maintained at a voltage different from that of the common conductor 33. As described hereinabove, the circuit breaker or relay 17 includes a plurality of contacts 28a–28cwhich are connected in series with the distribution circuit conductors A–C.

Operating power is supplied to the circuit illustrated in FIG. 3 through terminals 86 and 87, connected to the common conductor 33 and the circuit 83, respectively. Any conventional direct current source can be used for supplying this power, and, if desired, the power can be derived from the distribution circuit. One particularly suitable method for deriving the operating power from the distribution circuit is disclosed and claimed in copending application Ser. No. 39,005, filed May 20, 1970.

Operation of the ground fault detector illustrated in FIG. 3 can now be described briefly. Let it be assumed that the conductors A–Nhave been connected to a source of electrical energy and to a load. Under normal operating conditions, that is in the absence of a ground fault, the currents passing through the primary windings of the differential transformer 11 are balanced, and the net flux in the magnetic core 21 is zero. When a ground fault occurs, this current balance is destroyed, and a nonzero flux is produced in the core 21. A fault signal is induced in the secondary winding 23 and coupled to the inductor cores 26, 26 where it is stored in the form of a magnetic flux signal. The pulse train from the blocking oscillator 36 reads the stored flux signal out of the inductor cores and back to the differential transformer through the secondary winding 23. The signal delivered from the inductor cores has a magnitude which is generally proportional to the product of the flux density stored in the cores from the fault signal and to the amplitude of the leading edge of the pulse which causes the readout. This signal then appears across the tertiary winding 46 and is amplified in the operational amplifier 47. After amplification, this signal is rectified by the diodes D61, D62 and applied to the second blocking oscillator 63. The output from this oscillator is delivered to the accumulator capacitor C68. When the voltage across this capacitor builds up to the threshold voltage of the unilateral switch Q73, the unilateral switch turns on, firing the silicon-controlled rectifier SCR 78. When the SCR fires, the operating coil 27 of the circuit breaker or relay 17 is energized, opening the contacts 28a–28b[to disconnect the load from the source.

FIG. 4 illustrates an embodiment of the invention wherein the flux storage means 12 includes an additional transformer core 92. This additional core is coupled intermediate the differential transformer core 21 and the inductor core 26. It includes a first winding 93 having a plurality of turns connected to the secondary winding 23 of the differential transformer through conductors 24. The ratio of turns on the windings 23 and 93 can be chosen to provide a current step-up, thereby increasing the current available for the inductor core 26 while retaining the desirable feature of a single-turn primary windings on the differential transformer. If no current increase is desired, the winding 93 can be provided with the same number of turns as the winding 23. As illustrated, the inductor core 26 is coupled to the core 92 by a simple coupling link 94. An alternative and preferred form of coupling between these cores is described in copending application Ser. No. 38,966, filed May 20, 1970. The signal generator 13 and trip circuit 16 are shown coupled directly to the coupling core 92 through winding 96 and 97, respectively.

THe manner in which the flux signals are stored in and read out of the inductor cores of square loop material can be described with reference to FIGS. 5–9. FIG. 5 shows the hysteresis curve of a typical square loop inductor core. In this figure, the magnetic flux $\Phi$ in the core is plotted along the ordinate, and the total current $I_S$ carried by the conductor passing through the core is plotted along the abscissa. As can be seen from the drawing, as long as the current $I_S$ remains somewhat smaller in magnitude than the critical value $I_c$, the flux $\Phi$ remains relatively unchanged. However, when the current $I_S$ approaches and exceeds $I_c$, the flux $\Phi$ changes rapidly. This change in flux produces a voltage V in the conductor which is proportional to the rate of change of the flux $\Phi$ with respect to time.

FIG. 6 illustrates a square loop core 111 through which a single conductor 112 passes. A current pulser 113 is connected in parallel with the conductor 112, and the loss resistance of the core 111 is shown as a resistor R in parallel with the conductor 112. The conductor 1112 carries a current $I_F$ which is to be monitored, and the current pulser 113 produces large current pulses $I_p$. If $I_F$=0 the magnetic state of the core 111 is described by point A in FIG. 5 during the pulses and by point A' thereafter.

When the current $I_F$ in the conductor 112 is a nonzero, the magnetic state of the core 111 will move to a point such as D or B depending upon the amplitude of $I_F$. If $I_F$ is removed, the magnetic state goes to a point such as D' or B'. During the time when the magnetic state is changing from A or A' to D or B, the flux $\Phi$ is changing, and the voltage V has a value proportional to the rate of change of the flux $\Phi$. The rate of motion of the magnetic state along the hysteresis curve is determined by the sum of the currents $I_F$ and $I_p$ and by the loss resistance R. Since $I_F = I_S + I_P = V/R$, then $V = R(I_F - I_P - I_S)$. Between pulses, $I_P = 0, I_F - I_S$ is smaller than $I_F$, and $V$ is relatively small. At this time, if $I_F > I_c$, then $V$ is approximately proportional to $I_F - I_C$, but if $I_F < I_C$, then $V$ is approximately zero.

When a readout pulse is supplied by the current pulser 113, the magnetic state travels along the hysteresis loop from a point such as A', D, D', B, or B' to point A. Over most of this path, $I_S$ is limited to small values such as $I_c$ by the hysteresis curve. Again, $V = R(I_F - I_S - I_P)$. Since the magnitude of $I_P$ is generally much larger than that of $I_F$ and $I_S$, $V$ is approximately equal to $-RI_P$. This is a much larger voltage than that which occurs during the storage since $I_P$ is much larger than $I_F$. The voltage $V$ is a function of the preceding $I_F$, and the integral of $V$ over this time period is equal to the total flux change. This is approximately equal to the integral of voltage over the storage interval. While the readout voltage is much greater in magnitude than the storage voltage, its duration is shorter. It should be noted that if $I_F$ has been zero or negative since the preceding readout pulse, a small but nonzero voltage occurs on readout.

The circuit illustrated in FIG. 6 gives a usable output for only one polarity of $I_S$. FIG. 8 illustrates a balanced circuit which provides a usable output for both polarities of $I_S$. This balanced circuit consists of two circuits of the type shown in FIG. 8 connected in series, with one of the pulsers 113 reversed.

In the balanced circuit, whenever the current $I_F$ is zero, the small outputs of the two halves of the circuit cancel each other producing a zero output voltage $V$. With the balanced circuit, it is not necessary that the drive pulses be of a single polarity. This circuit can be driven by a pair of successive pulses of opposite polarity or by any other program of pulses as long as there is sufficient time for the last pulse to decay and for storage to be accomplished. The first pulse after storage causes readout of the manner described hereinbefore. Subsequent pulses of the same polarity cause small flux changes which are equal and opposite in the two halves of the circuit, producing zero output. Subsequent pulses of opposite polarity cause large equal and opposite flux changes which cancel, giving zero output voltages. It will be noted that the flux storage means in the circuit illustrated in FIG. 3 of the balanced type shown in FIG. 8.

FIG. 10 shows another embodiment of a ground fault detector and current interrupter which can be constructed in a small package. While FIG. 10 shows only a two-wire distribution system consisting of conductors A and N, the embodiment can of course be utilized with other single-phase and polyphase systems as well.

In the embodiment shown in FIG. 10, the flux storage means includes a single inductor core 26. This core is coupled to the secondary winding 23 of the differential transformer 11 through a coupling transformer 21. This coupling transformer includes a core of magnetic material 122, and input winding 123, and an output winding 124. As illustrated, the inductor core 26 is coupled to the coupling transformer core 122 by a coupling link 126. An alternative method for coupling the inductor core 26 to the coupling transformer core is disclosed and claimed in copending application Ser. No. 38,966, filed May 20, 1970.

The input winding 123 of the coupling transformer is connected to the secondary winding 23 of the differential transformer through a pair of inductors L131 and L132. In the presently preferred embodiment, the winding 23 consists of a single layer of windings extending around the full circumference of the differential transformer core 21. The numbers of turns in the windings 23 and 123 can be selected to provide the current required by the inductor core 26, while at the same time retaining the desirable features of single-turn primary windings on the differential transformer and coupling to the reactor core 26 through a single turn.

A capacitor C113 is connected across the secondary winding 23 of the differential transformer. This capacitor cooperates with the inductors L132 and L133 and windings 23 and 123 to provide a low-pass filter between the differential transformer and coupling transformer. These filter components are chosen to provide very little impedance to the flow of 60 Hertz current between the windings 23, 123 and to provide a high degree of isolation for signals of higher frequency. Thus, disturbances of short duration in the distribution system, such as the transients which occur when the load is first connected to the line, are not coupled to the inductor core 26 and therefore cannot cause false tripping of the current interrupter. As is discussed hereinbelow, the inductors L131, L132 also provide isolation between the readout pulse generator and the capacitor C133. The capacitor C133 provides a slight resonant effect with the winding 23, enhancing the voltage induced therein.

Readout pulse generator means is provided for generating a train of pulses for reading-stored fault signals out of the reactor core 26. This means includes a unilateral switching device Q136 having its cathode 136c connected to one terminal of a capacitor C137 and its anode 136a connected to one terminal of a resistor R138. The remaining terminals of the resistor and capacitor are connected together by a conductor 139. The anode of the diode D141 is connected to the junction of the capacitor C137 and the cathode 136c of the unilateral switch. Operating power is supplied to the pulse generating means through the conductor 139 and the diode D141 in a manner described hereinafter. In operation, the capacitor C137 is charged until the threshold voltage of the unilateral switching device Q136 is reached, at which time that device fires, discharging the capacitor and producing a voltage pulse across the resistor R138. The resistor R138 is connected to the input winding 123 of the coupling transformer 121 through a conductor 142 and a variable resistor R143. This variable resistor provides means for adjusting the level of the pulses delivered to the coupling transformer and inductor core, thereby permitting adjustment of the minimum fault current level which will cause tripping of the interrupter. In the preferred embodiment, the capacitor C137 and resistor R138 are chosen to have values which will produce pulses having a duration on the order of 1 microsecond. The inductors L131 and L132 provide isolation between the output of the pulse-generating means and the capacitor C133 so that the pulses generated are not attenuated by the capacitor.

Means is provided for timing the occurrence of the readout pulses relative to the cycle of the fault current. Since most ground faults are purely resistive in nature, or at least substantially so, the ground fault current will be in phase with the voltage in the distribution system. Thus, the readout pulses can be timed relative to the distribution system conductors N and A through resistors R148 and R149, respectively. Resistors R151 and R152 are connected in series between the conductors 146 and 147 to provide a voltage divider. The conductor 139 is connected to the junction of the resistors R151 and R152. A capacitor C153 and a resistor R154 are connected in series between the conductors 146 and 147, and the cathode of the diode D141 is connected to their junction. The timing of the readout pulses relative to the voltage in the conductors 146 and 147, and hence to the fault current, can be adjusted by adjusting the values of C153 and R154. In the preferred embodiment, these values are chosen such that the readout pulses will occur shortly before the end of the positive half-cycle of the fault current.

THe output winding 124 of the coupling transformer 121 is connected to the gate 156g of a silicon-controlled rectifier SCR 156 through a diode D157. A resistor R158 and a capacitor C159 are connected between the gate 156g and cathode 156c of the SCR. It has been observed that while the trip voltage of SCRs remains substantially constant, the trip current increases as temperature decreases. The capacitor C159 is chosen to have a reactance which varies with temperature in a manner opposite to the SCR gate, thereby providing temperature compensation for the SCR. In addition, the resistor R158 and capacitor C159 provide a low-impedance input to the gate of the SCR which has been found to provide very stable operation and low susceptibility to false tripping.

The silicon-controlled rectifier SCR 156 is connected for controlling the energization of the circuit breaker or relay 17. The anode 156a of the SCR is connected to one terminal of the circuit breaker trip coil 27 by a conductor 161, and the other terminal of the trip coil is connected to the positive terminal of a source of direct current through a conductor 162. The cathode 156c of the SCR is connected to the negative terminal of the DC source through conductors 163 and 164. Direct current is supplied to the conductors 162 and 164 from the distribution system by a diode bridge 166 having its input terminals connected to the conductors 146, 147 and its output terminals connected to the conductors 162, 164. A zener diode Z167 is connected between the conductors 162 and 164 to regulate the output of the diode bridge. A capacitor C168 is also connected between the conductors 162 and 164. This capacitor provides means for storing energy from the diode bridge for energizing the trip coil 27 when the SCR is triggered.

Low-pass filter means is provided for isolating the pulse-generating means, silicon-controlled rectifier, and circuit breaker from brief disturbances such as transients and voltage surges in the distribution system which might otherwise cause false tripping of the current interrupter. This means includes the resistors R148 and R149 connected between the conductors 146, 147 and N, A, respectively. It also includes a capacitor C171 connected between the conductors 146 and 147. In addition to being a part of the low pass filter, the resistors R148 and R149 are voltage-dropping resistors. In the preferred embodiment, the capacitor C171 is chosen to have a high impedance to currents having frequency on the order of 60Hertz and to provide high attenuation of higher frequencies.

Means is provided for testing the operation of the ground fault detector and current interrupter. This means includes a resistor R173 and a normally opened switch SW174 connected in series between the conductors A and N on opposite sides of the differential transformer core 121.

Operation and use of the ground fault detector and current interrupter illustrated in FIG. 10 can now be described briefly. In the absence of a fault signal, there is no flux signal stored in the inductor core 26 to be readout by the pulses from the pulse-generating means. Accordingly, the silicon-controlled rectifier SCR 156 remains turned off, the trip coil 27 is not energized, and the contacts 28a and 28n remain closed. During this time, the capacitor C168 is charged with current from the diode bridge 166. When a ground fault occurs, a signal is produced in the secondary winding 23 of the differential transformer and coupled through the coupling transformer 121 to the inductor core 26 where it is stored in the form of magnetic flux. This stored flux signal is read out of the core 26 by a pulse from the pulse-generating means to produce a signal in the secondary winding 124 of the coupling transformer which fires the SCR, discharging the capacitor 168 into the trip coil 27 and opening the contacts 28a and 28n.

When the SCR 156 fires, the current flow from the capacitor C168 through the trip coil 27 follows an impulse pattern and decreases to a value less than the holding current of the SCR at which time the SCR ceases to conduct. The values of the resistors R148 and R149 are chosen such that the current supplied through them is less than the holding current of the SCR so that the SCR can shut off once the capacitor C168 has discharged. Immediately following its discharge, the capacitor C168 presents a very low impedance to the power supply, reducing the voltage between the conductors 146 and 147 below its normal steady-state AC value. THis low AC voltage inhibits the pulser capacitor C137 from gaining enough charge to fire the unilateral switching device C136 until the capacitor C168 has nearly finished charging and is able to operate the circuit breaker trip mechanism successfully.

Utilizing components available today, the embodiment illustrated in FIG. 10 can be constructed in a package having a volume less than 1cubic inch except for the circuit breaker 17.

FIG. 11 illustrates the use of a reed relay RY176 in the embodiment shown in FIG. 10. This reed relay is of conventional design and has a pair of normally open contacts 177 and 178 adapted for closing when the relay is subjected to a magnetic field. The contact 177 is connected to one end of the trip coil 27, and the other end of the trip coil is connected to the distribution circuit conductor N. The other reed relay contact 178 is connected to the conductor A.

An energizing coil 181 is disposed proximate to the reed relay RY176. One end of this coil is connected to the anode 156a of the silicon-controlled rectifier SCR 156, and the other end of the coil is connected to the conductor 162 and to one side of the capacitor C168 through a current limiting resistor R182. A capacitor C183 is connected across the coil 181.

Operation and use of the switching circuit illustrated in FIG. 11 can now be described briefly. As in the embodiment illustrated in FIG. 10, in the absence of a fault current the SCR remains nonconducting and the capacitor C168 is charged from the conductors A and N through the resistors R148 and R149, the conductors 146 and 147, and the diode bridge 166. Upon the occurrence of a ground fault, the SCR is turned on, and the capacitor C168 discharges through the resistor R182 into the capacitor C183 and coil 181. Having received some of the charge from the capacitor C168, the capacitor C183 is discharged by the coil 181. The current flow in the coil due to the discharging of the capacitors produces a magnetic field which closes the relay contacts 177 and 178. The trip coil 27 is thus connected between the conductors A and N, energizing that coil with current directly from the AC line. Thus, with this circuit it is necessary to store only enough energy to actuate the reed relay. In addition, it should be noted that the use of the capacitor C183 in combination with the capacitor C168 increases the amount of capacitance in the circuit when the SCR is turned on, thereby increasing the time interval during which the coil 181 is energized to assure the tripping of the trip coil.

FIG. 12 illustrates a ground fault detector incorporating the present invention and including means for providing a visual indication of the occurrence of a ground fault. This detector and indicator includes a differential transformer 201, a coupling transformer 202, a pair of inductor cores 203, a pulse generator 204, an indicator lamp 206, and a triac switching element 207.

The differential transformer 201 includes a toroidal core 211, a plurality of single-turn primary windings 212 adapted for connection in series with the conductors of a distribution circuit, and a secondary winding 213. The secondary winding has a plurality of turns wound on the toroidal core 211. In one presently preferred embodiment, this winding consists of 2,000turns tapped to provide a central winding 214 of 200turns, a first outer winding 216 of 1,000turns and a second outer winding 217 of 800turns. A pair of clamping diodes 218, 219 are connected back to back across the entire secondary winding 213. This 2,000turn winding and the clamping diodes limit the voltage produced by large fault signals, thus preventing the suppression of readout signals and possible damage to the components in the circuitry by large fault currents.

The coupling transformer 202 includes a toroidal core 221, a primary winding 222 consisting of a plurality of turns wound on the core, and a single-turn secondary winding 223 passing through the core. The primary winding 222 has a number of turns corresponding to the number of turns on the central winding 214 of the differential transformer secondary. These two windings are connected together by a conductor 224 and a choke 226. The choke prevents loading of the readout signals by the differential transformer.

The coupling transformer is coupled to the inductor cores 203 by means of single-turn windings 227, 228 passing through the inductor cores and connected in series with the coupling transformer secondary winding 223. Thus, as in the embodiments hereinbefore described, the inductor cores 203 provide means for storing magnetic flux signals corresponding to ground fault currents.

The fault generator 204 provides means for reading the stored flux signals out of the inductor cores 203. This pulse generator includes a diac 231 and a pulse transformer 232 having a primary winding 232a and a secondary winding 232b. Operating power for the pulse generator and indicating lamp 206 is provided by a conventional source of 120-volt, 60-Hertz AC connected to input terminals 234, 236. Power is supplied to one terminal of the diac from the input terminal 234 through a resistor 237, the lamp 206, and a resistor 238. The other terminal of the diac is connected to one end of the pulse transformer primary 232a, and the other end of this primary is connected to the second input terminal 236. With 120-volt 60-hertz AC, this pulse generator produces a train of about 14 pulses per half cycle, each pulse having a duration on the order of 3 to 4 microseconds. These pulses appear across the primary winding 232a of the pulse transformer and are coupled to the secondary winding 232b. From the secondary winding they are applied to the inductor cores 203 through resistors 241, 242.

Ignition of the lamp 206 is controlled by the triac 207 which is connected in series with the lamp, the resistor 237, and the source of alternating current. The gate 243 of the triac is connected to one end of the winding 222 on the coupling transformer, and the terminal 244 of the triac is connected to the other end of the winding.

Operation and use of the ground fault detector and indicator shown in FIG. 13 is generally similar to that of the embodiment illustrated in FIG. 12 can now be described briefly. Let it be assumed that the terminals 234 and 236 have been connected to a source of 120-volt, 60-hertz alternating current and that the primary winding 212 of the differential transformer have been connected in series with the conductors of a distribution circuit. The pulse generator 232 operates continuously, delivering readout pulses to the inductor cores 204. In the absence of ground fault current, there is no flux stored in these cores to be read out, and the traic 207 does not conduct. Since the current by the pulse generator is not sufficient to ignite the lamp 206, the lamp remains extinguished. If transient disturbances should cause the triac to fire, the lamp will be lighted for no more than one-half cycle of the supply current since the triac releases on each zero crossing of the supply current.

FIG. 13 illustrates another embodiment of a ground fault detector and indicator which is generally similar to that shown in FIG. 12. In the circuit of FIG. 13, however, includes a traic 251 for generating the readout pulses. This triac is connected in series between the supply resistor 238 and the resistors 241, 242 which deliver the readout pulses to the inductor cores 203. As illustrated in FIG. 13, the firing of the triac 251 is controlled by the diac 231. Alternatively, the diac 231 could be replaced by a resistive network, or the avalanche characteristics of the triac itself could be used for triggering. The triac provides current pulses of sufficient magnitude that saturation of the differential core is adequate to prevent large fault currents from overcoming the readout current. Accordingly, in this embodiment the differential transformer has a single secondary winding of approximately 200turns.

OPeration and use of the ground fault detector and indicator shown in FIG. 13 is generally similar to that of the embodiment illustrated in FIG. 12 and described hereinbefore. However, in the FIG. 13 embodiment the readout pulses are generated by the triac 251 at the rate of one per half cycle of the operating current.

It is apparent from the foregoing that a new and improved ground fault detector and method have been provided. While only the presently preferred embodiments have been described herein, it will be apparent to those familiar with the art that certain changes and modifications can be made without departing from the scope of the invention as defined by the following claims.

I claim:

1. In apparatus for detecting leakage currents in a system having a plurality of conductors carrying electrical current between a source and a load, a differential transformer having a magnetic core and primary windings formed by at least two of said conductors passing through said core to produce zero net magnetic flux in said core during normal conditions and a nonzero net flux signal in said core when leakage occurs, magnetic flux storage means coupled to said differential transformer for storing the flux signal produced by a leakage current, and means connected to said flux storage means for reading the stored flux signal out of said storage means.

2. Apparatus as in claim 1 together with current-interrupting means having contacts movable between open and closed states and adapted to be connected into said conductors, said current-interrupting means also having an operating coil controlling the state of said contacts, and electrical signal-conditioning means intermediate said flux storage means and said operating coil for tripping said coil and opening said contacts to interrupt the current flow in said conductors in response to the flux signal read out of said storage means.

3. Apparatus as in claim 2 wherein said electrical signal-conditioning means includes electronic switching means for controlling the flow of current in said operating coil.

4. Apparatus as in claim 2 wherein said electrical signal-conditioning means includes counting means for delaying the opening of said contacts until a predetermined number of flux signals have been read out of said flux storage means.

5. Apparatus as in claim 2, together with pulsating power supply means connected for supplying pulsating operating power to said signal-conditioning means.

6. Apparatus as in claim 2, together with direct current power supply means connected to said conductors for providing operating power for the apparatus from the alternating current supplied by said source.

7. Apparatus as in claim 6 together with capacitor means connected for receiving energy from said direct current power supply means and storing said energy for delivery to the operating coil of said current-interrupting means.

8. Apparatus as in claim 7 together with means for inhibiting the operation of the means for reading the stored flux out of the storage means until said capacitor has been charged to a predetermined level.

9. Apparatus as in claim 1 wherein said flux storage means includes at least one indicator core adapted for changing between states of high and low permeability in accordance with the magnetomotive force applied thereto.

10. Apparatus as in claim 9 wherein said inductor core is fabricated of a material having a high nickel content.

11. Apparatus as in claim 9, together with at least one additional transformer core coupled to the magnetic core in said differential transformer and to said reactor core.

12. In a miniaturized protective device for detecting fault currents to ground from conductors forming a path for electrical current between a source and a load, a differential transformer having a magnetic core of high-permeability material and having at least two of said conductors passing through said core to form single-turn primary windings adapted for producing zero net magnetic flux in said core during normal current conditions and for producing a nonzero flux signal in said core when a ground fault occurs, said differential transformer also having a secondary winding of at least one turn on said core, at least one inductor core coupled to said magnetic core through said secondary winding and adapted to change from a first state of permeability to a second state of permeability in response to the magnetomotive force produced by a fault current, thus providing means for storing the signal produced by a fault current as a flux signal, pulse generator means coupled to said inductor core for reading the stored flux signal out of said core by delivering a current pulse to said inductor core for causing it to change back to its first state of permeability, a tertiary winding on the magnetic core of said differential transformer adapted for receiving the flux signal read out of said inductor core, current interrupter means having normally closed contacts connected in said conductors and having an operating coil adapted for opening said contacts when energized, and electrical signal-conditioning means connected intermediate said tertiary winding and said operating coil for energizing said coil to interrupt the flow of current in said conductors in response to a fault current.

13. A miniaturized protective device as in claim 12 wherein said pulse generator means comprises a blocking oscillator.

14. A miniaturized protective device as in claim 12 wherein said electrical signal-conditioning means includes detector means connected for receiving the signal from said tertiary winding and electronic switch means connected to said operating coil and triggered by the output from said detector means for energizing said coil in response to the signal read out of said inductor core.

15. A miniaturized protective device as in claim 14 together with amplifier means connected intermediate said tertiary winding and said detector means.

16. A miniaturized protective device as in claim 15 wherein said electrical signal-conditioning means further includes accumulator capacitor means and a unilateral switch connected intermediate said detector means said electronic switch means for delaying the interruption of the current in said conductors until a predetermined number of ground fault flux signals have been read out of said reactor core.

17. In a miniaturized protective device for detecting fault currents to ground from conductors forming a path for electrical current between a source and a load, a differential transformer having a toroidal magnetic core of high-permeability material and having at least two of said conductors passing through said core to form single-turn primary windings adapted for producing zero net magnetic flux in said core during normal current conditions and for producing a nonzero net flux signal in said core when a ground fault occurs, an inductor core adapted to be changed from a first state of permeability to a second state of permeability by the magnetomotive force produced by a fault current, thus providing means for storing the flux signal produced by a fault current, a coupling core coupled to said magnetic core and to said inductor core, pulse generator means coupled to said reactor core through said coupling core for reading the stored flux signal out of said inductor core, and an output winding on said coupling core adapted for receiving the stored flux signal from the inductor core.

18. A miniaturized protective device as in claim 17 together with current-interrupting means having normally closed contacts connected in said conductors and having an operating coil adapted for opening said contacts when energized and electrical signal-conditioning means contacted intermediate said output winding and said operating coil for energizing said coil to interrupt the flow of current in said conductors in response to a fault current.

19. A miniaturized protective device as in claim 18 wherein said electrical signal-conditioning means includes a silicon-controlled rectifier.

20. A miniaturized protective device as in claim 19 together with temperature compensation means connected to said silicon-controlled rectifier.

21. A miniaturized protective device as in claim 19 together with capacitor means connected to said silicon-controlled rectifier and to said operating coil, said capacitor means being adapted for storing electrical energy for energizing said operating coil on triggering of said silicon-controlled rectifier.

22. A miniaturized protective device as in claim 21 together with regulated power supply means connected for charging said capacitor to a predetermined voltage and a network of resistors and capacitors connected intermediate said conductors and said power supply means, said network being adapted for providing said power supply means with an AC voltage smaller than the voltage across said conductors and for filtering out transients and other spurious changes in the voltage across said conductors to isolate the protective device from such transients and changes to prevent false tripping of the interrupting means in response thereto.

23. A miniaturized protective device as in claim 17 together with low-pass filter means connected intermediate said differential transformer and said reactor core.

24. A miniaturized protective device as in claim 17 together with means for timing the output of said pulse generator means relative to the phase of the ground fault current.

25. In a method for detecting fault currents to ground from conductors forming a path for electrical current between a source and a load, passing the current in at least two of said conductors through the primary windings of a differential transformer to produce zero net flux in the core of said transformer during normal current conditions and to produce a nonzero flux signal upon the occurrence of a ground fault, storing a flux signal corresponding to the nonzero flux signal from said differential transformer in an inductor core, and reading the stored flux signal out of said inductor core.

26. A method as in claim 25 together with the additional steps of connecting current-interrupting contacts into said conductors, said contacts being adapted to be opened by energizing an operating coil, and energizing said operating coil with a signal derived from said stored flux signal.

27. A method as in claim 25 together with the additional step of delaying the energizing signal by means of an accumulator capacitor to prevent energizing said coil until a predetermined number of flux signals have been stored in said inductor core, thereby preventing interruption of the current in said conductors except when a ground fault of predetermined duration occurs.

28. A method as in claim 25 together with the additional step of delaying the coil-energizing signal until a signal of predetermined magnitude has been stored in said inductor core, thereby preventing interruption of the current in said conductors except when a ground fault of predetermined amplitude and energy content per pulse occurs.

29. In apparatus for indicating the occurrence of ground fault currents forming a path for electrical current between a source and a load, a differential transformer having a magnetic core and a plurality of single-turn primary windings passing through said core and adapted for connection in series with said conductors for producing zero net magnetic flux in said core during normal current conditions and for producing a nonzero flux signal in said core when a ground fault occurs, magnetic flux storage means coupled to said differential transformer for storing the flux signal produced by a ground fault, pulse-generating means connected to said flux storage means for reading stored flux signal out of said storage means, and means connected for receiving the flux signal read out of said storage means and producing a visual indication in response thereto.

30. Apparatus as in claim 29 wherein said means connected for receiving the flux signal and producing a visual indication includes a transformer winding coupled to said storage means, and electrically actuated visual display element, and a switching element connected for controlling the actuation of said display element, said switching element being connected to said transformer winding in such manner that its conductivity is controlled by the flux signal from said storage means.

31. Apparatus as in claim 29 wherein said pulse generating means includes a bilateral switching element.

32. Apparatus as in claim 29 wherein said differential transformer includes a secondary winding having a plurality of turns and clamping diode means connected across said winding for limiting the signal produced by large fault currents.

33. Apparatus as in claim 30 wherein said switching element is a bilateral switching element.